United States Patent [19]

Yamada et al.

[11] Patent Number: 5,185,879
[45] Date of Patent: Feb. 9, 1993

[54] CACHE SYSTEM AND CONTROL METHOD THEREFOR

[76] Inventors: Akira Yamada, Mai Shiti 3-703, 1-1, Nakano-Nishi 3-Chome, Itami-shi, Hyogo-ken; Tatsuo Yamada, 105 ON haim, 389, Onna, Atsugi-shi, Kanagawa-ken, 243, both of Japan

[21] Appl. No.: 734,088

[22] Filed: Jul. 22, 1991

Related U.S. Application Data

[63] Continuation of Ser. No. 274,522, Nov. 21, 1988, abandoned.

[30] Foreign Application Priority Data

Jan. 21, 1988 [JP] Japan .................. 63-11222
Jan. 21, 1988 [JP] Japan .................. 63-11223

[51] Int. Cl.⁵ .............................. G06F 13/16
[52] U.S. Cl. ..................... 395/425; 364/DIG. 1; 364/240.5; 364/243.41; 364/238.4
[58] Field of Search ................... 395/425, 325

[56] References Cited

U.S. PATENT DOCUMENTS

| | | | |
|---|---|---|---|
| 3,993,981 | 11/1976 | Cassarino, Jr. et al. | 364/200 |
| 4,030,075 | 6/1977 | Barlow | 364/200 |
| 4,195,340 | 3/1980 | Joyce | 364/200 |
| 4,214,303 | 7/1980 | Joyce et al. | 364/200 |
| 4,323,967 | 4/1982 | Peters et al. | 364/200 |
| 4,323,968 | 4/1982 | Capozzi | 364/200 |
| 4,433,374 | 2/1984 | Hanson et al. | 364/200 |
| 4,646,233 | 2/1987 | Weatherford et al. | 364/200 |
| 4,661,905 | 4/1987 | Bomba et al. | 364/200 |

Primary Examiner—Michael R. Fleming
Assistant Examiner—Debra A. Chun
Attorney, Agent, or Firm—Lowe, Price, LeBlanc & Becker

[57] ABSTRACT

A cache system which, when a cache is a bus master, puts a CPU in a standby state and makes effective a signal common to the CPU and cache and a signal decided only by the cache, or when the CPU is the bus master, makes effective the signal common to the CPU and cache and the signal decided only by the CPU, or when at a cache miss, the cache gives the CPU a control signal requesting reexecution of memory access and a control signal to allow the memory system to accept memory access to thereby operate the cache dependently on the CPU, so that even when either the CPU or the cache is the bus master, signal transmit-receive with respect to the memory system is adapted to be carried out substantially at the same timing. Furthermore, where a cache miss occurs when the CPU accesses to single data, and in order to cope with the case that a plurality of data from the memory system to the cache are transferred, the data of address next to the accessed address by the CPU is initially transferred from the memory system to the CPU, thereafter data is transferred to the CPU while changing the address in a so-called round robin method, and at last the object data for the CPU is controlled to be transferred in parallel to the CPU and cache, thereby minimizing the number of times for data transfer from the memory system to the cache.

9 Claims, 10 Drawing Sheets

Fig. 1

Prior Art

Fig. 2

Prior Art

Prior Art

CACHE SYSTEM AND CONTROL METHOD THEREFOR

This application is a continuation of application Ser. No. 07/274,522 filed Nov. 21, 1988 now abandoned.

BACKGROUND OF THE INVENTION

1. Field of the Invention

The present invention relates to a cache system for a computer system, and more particularly to a cache system and a control method therefor which is designed to access at high speed to a memory system when in a cache miss.

2. Description of the Prior Art

Figure 1:
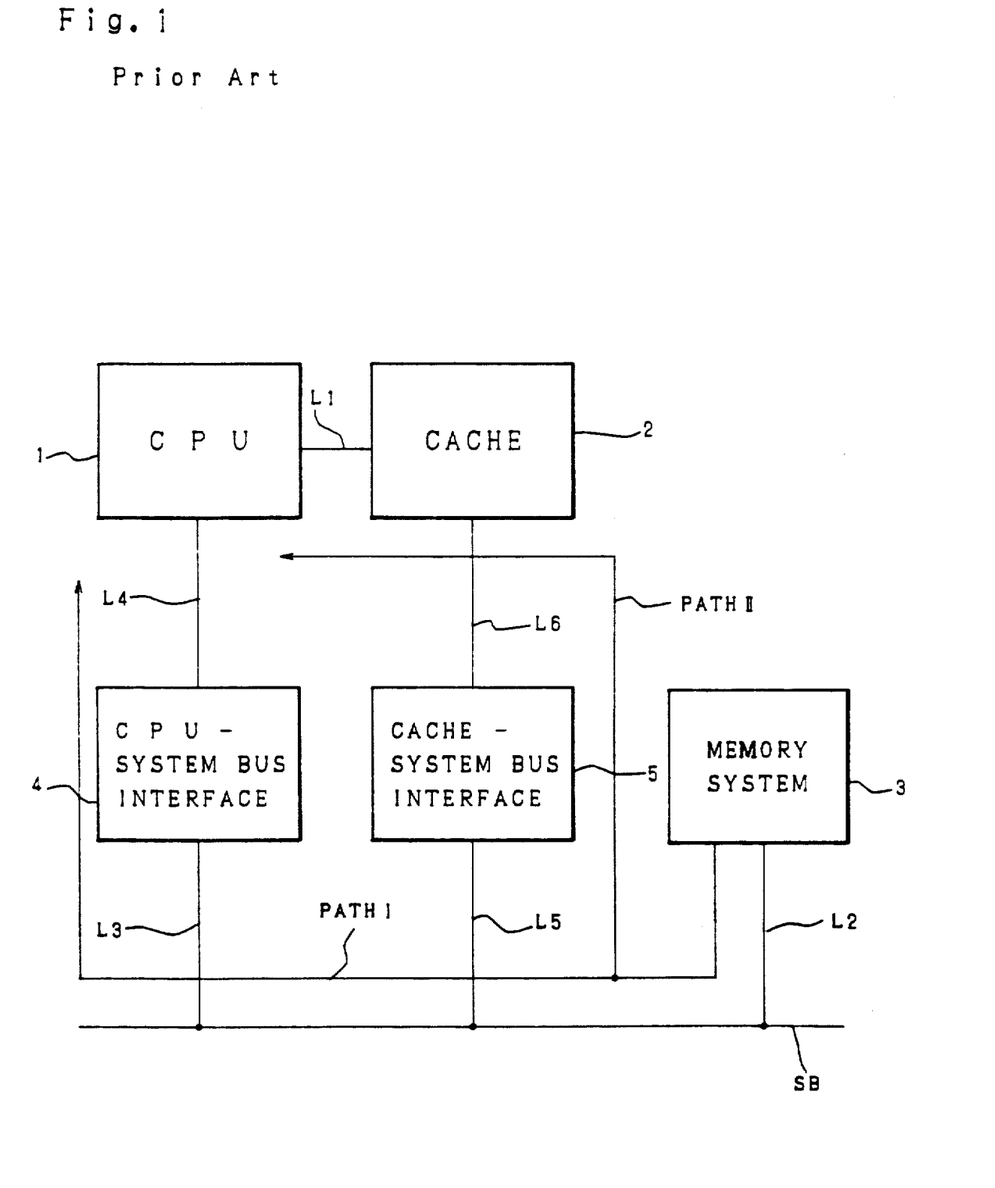
FIG. 1 is a block diagram of a structure of the conventional cache system.

FIG. 1 is a block diagram of the conventional cache system, in which reference numeral 1 designates a CPU, 2 designates a cache, both the CPU and cache carrying out signal transmitting-receiving with each other through a bidirectional CPU-cache signal line L1, 3 designates a memory system which is connected to the CPU 1 through a connection line L2, a system bus SB, a connection lines L3, a CPU-system bus interface 4, and a connection line L4, and to the cache 2 through a connection line L2, a system bus SB, a connection line L5, a cache system bus interface 5 and a connection line L6.

In such construction, the CPU 1 gives a cache enabling signal to the cache 2 through the CPU-cache signal line L1 to thereby decide use or non-use of the cache 2.

When the CPU 1 puts the cache enabling signal in a notable state so as not to use the cache 2, the CPU 1 accesses the memory system 3 through the connection line L4, CPU-system bus interface 4, connection line L3, system bus SB and connection line L2 (the course is called the "route I"), thereby reading and writing data. In this case, the CPU 1 serves as a bus master.

When the CPU 1 uses the cache 2 by putting the cache enabling signal in an enable state and the corresponding data exists in the cache 2 (cash hit), the CPU 1 reads the data from the cache 2 at high speed through the CPU-cache signal line L1, in which the CPU 1 also is the bus master.

When the CPU 1 uses the cache 2 and the corresponding data does not exist therein (cache miss) the CPU 1 accesses the memory system 3 through the CPU-cache signal line L1, cache 2, connection line L6, cache-system bus interface 5, connection line L5, system bus SB and connection line L2 (the course is called the "route II"), thereby reading and writing the data. In this case, the cache 2 serves as the bus master after the cache miss.

Figure 2:
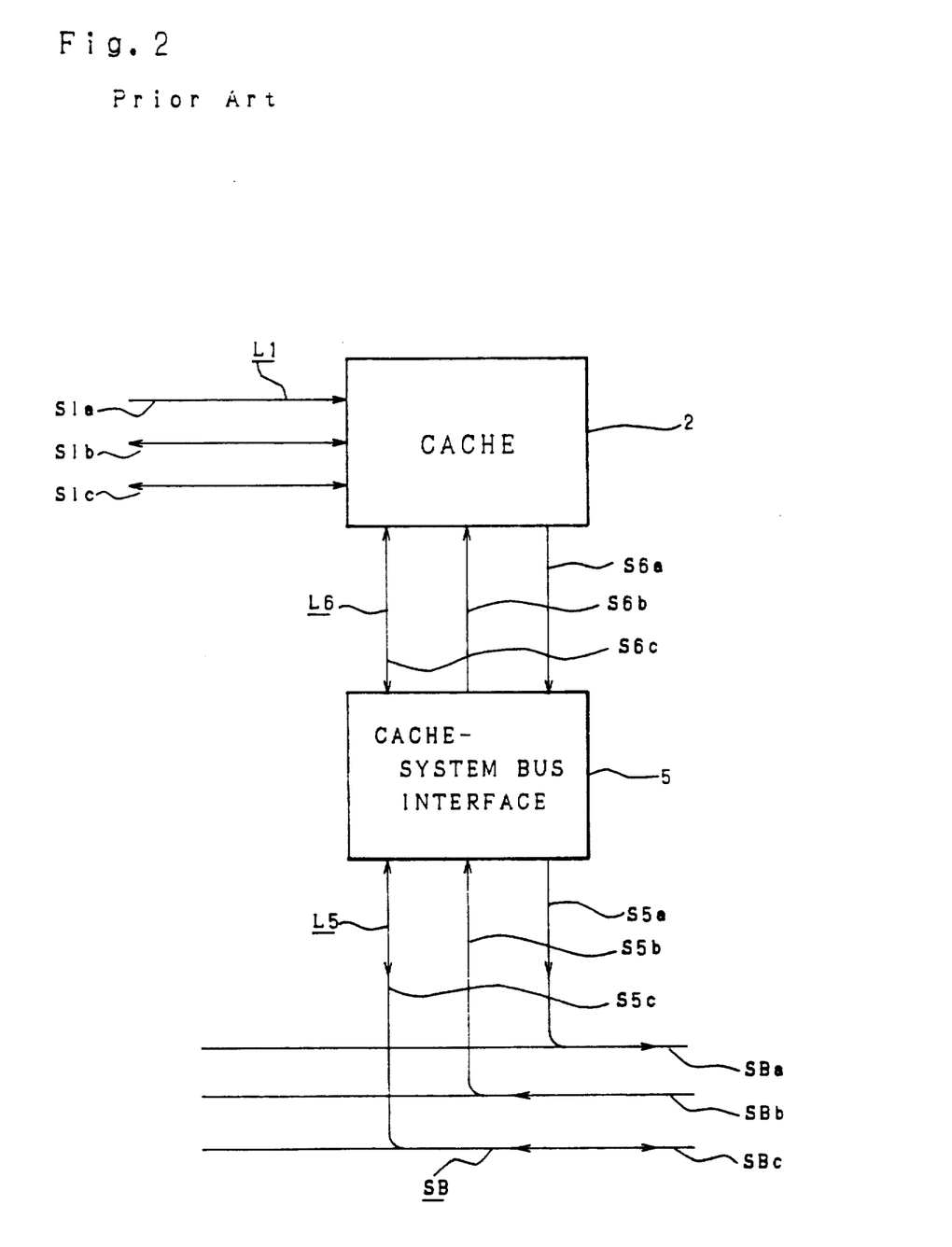
FIG. 2 is a block diagram of detailed structure for transmitting and receiving a signal between the cache and the system bus.

FIG. 2 is a structural view explanatory in detail of connection of signal lines between the cache 2 and the system bus SB.

As shown in the same drawing, at the CPU-cache signal line L1, connection lines L6 and L5, and system bus SB, address signals S1a, S6a, S5a and SBa, data signals S1b, S6b, S5b and SBb, and control signals S1c, S6c, S5c and SBc are transferred in the direction of the arrows in FIG. 2.

In the conventional cache system, constructed as the above-mentioned, the CPU 1 reads the data from the memory system 3 through different routes I and II respectively when the cache 2 is not used and the cache miss occurs.

A signal arrival time from the memory system 3 to the CPU 1 at the routes I and II, when the pass times for the CPU system bus interface 4 and the cache-system bus interface 5 are assumed to be about equal, the arrival time through the route II delays by a pass time for the cache 2. Therefore, a designer for the memory system 3 should design in consideration of the following matters.

For example, the memory system being very slow in access time in comparison with the CPU 1 and cache 2 must transmit to the CPU 1 (or the cache 2) a ready signal for indicating the data has been stably written in or ready to be read out. Next, explanation will be given on when the memory system 3 outputs the ready signal.

The ready signal, in accordance with the setup time standard, must be reached before a predetermined time the clock in synchronism with the CPU 1 rises up (or falls down). Hence, the CPU 1 can stably fetch the ready signal.

However, when the bus master is the CPU 1, the transmission route of ready signal is the route I, and when the bus master is the cache 2, that is the route II. Therefore, the timing of generating the ready signal must be changed depending upon which is the bus master, thereby causing various difficulties in design. Since the CPU 1 in synchronism with an internal clock fetches the signal (the ready signal included), when the ready signal, which passes through the cache 2, delays and is fetched into the CPU 1 for the next clock cycle period, the problem occurs in that the performance of the system is deteriorated.

On the other hand, it is possible to reduce a pass time of the signal through the cache 2, which is not practical because the reduction of time is limited when the clock frequency of the entire system becomes extremely high. Furthermore, there is the problem in that the time is different depending upon whether address decided by the CPU 1 is transmitted through the route I or through the route II.

The aforesaid conventional cache system, when the system is designed, must carry out the timing design and circuit design regarding two cases of the routes I and II, which makes the system design difficult. Also, the system design is difficult also when the timing regulation of the CPU 1 is different from that of the cache 2, either of which being the bus master.

SUMMARY OF THE INVENTION

In order to solve the above problem, the present invention has been designed. An object thereof is to provide a cache system which is similarly designable of the timing regulation for peripheral units connected to a data bus of, for example, a memory system when either of the cache or the CPU is the bus master.

Another object of the present invention is to provide a control method for the cache system, which, when data needs to be transferred from the memory system to the cache in case of a cache miss, can minimize the number of times of transferring the data.

The cache system of the invention, when the cache in a first invention is the bus master, puts the CPU in a standby condition, makes effective a signal common to the CPU and to the cache and a signal decided only by the cache, and, when the CPU is the bus master, makes effective the signal common to the CPU and cache and the signal decided only by the CPU, and also, in a second invention, a control signal requiring reexecution of memory access and that a control signal for accepting access with respect to the memory system are given from the cache to the CPU when in case of a cache miss so as to operate the cache depending on the CPU, whereby even when either the CPU or the cache is the bus master, the signal transfer between the CPU or cache and the memory system is adapted to be substantially performed at the same timing.

The control method for the cache system of the invention, in a case where a cache miss is generated when the CPU accesses single data and a plurality of data are block-transferred from the memory system to the cache, transfers at first data of address next to the object address for accessing by CPU from the memory system to the CPU, and thereafter, while the address is changed in a manner of the so-called round robin method, the data is transferred to the CPU and at last the object data for accessing by the CPU, in other words, the data of cache miss is transferred in parallel to the CPU and cache from the memory system, thereby minimizing the number of times for data transfer from the memory system to the cache.

The above and further objects and features of the invention will more fully be apparent from the following detailed description with accompanying drawings.

DESCRIPTION OF THE PREFERRED EMBODIMENTS

Next, the present invention will be described with reference to the drawings showing the embodiments thereof.

Figure 3:
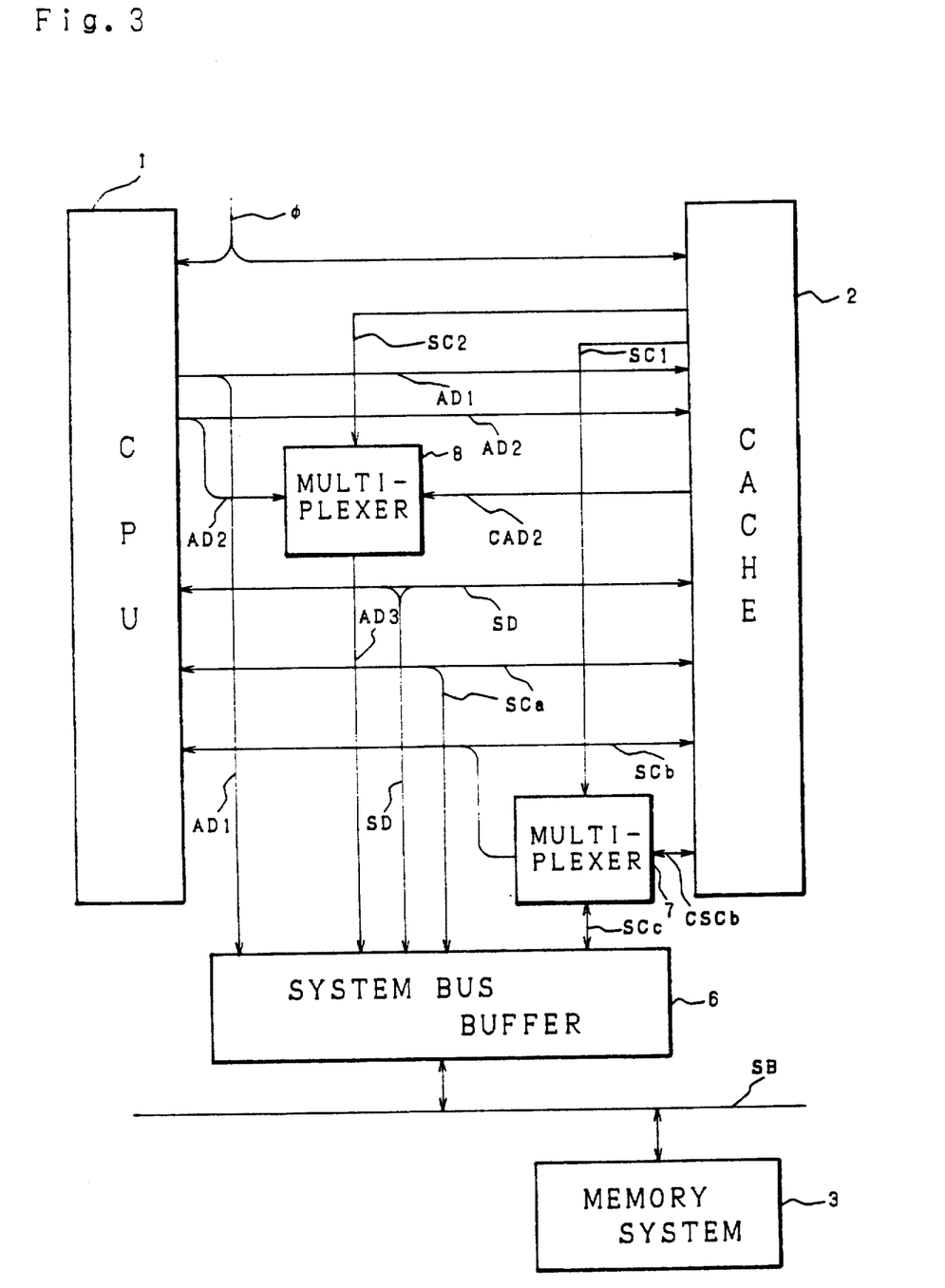
FIG. 3 is a block diagram of structure of the cache system of the first invention.

FIG. 3 is a block diagram showing a structure of a cache system of a first invention mainly of a CPU and a cache, in which a system buffer 6 is provided as a common interface between a CPU 1, a cache 2 and a system bus SB. Signals delivered among the above components are roughly classified into a control signal, an address signal and a data signal, the control signal SCa being utilized as the bidirectional common control signal among the CPU 1, the cache 2 and the system buffer 6. On the other hand, the control signal SCb used only when the CPU 1 is the bus master, is utilized as the bidirectional signal between the CPU 1 and the cache 2 and between the CPU 1 and a multiplexer, the control signal CSCb used only when the cache 2 is the bus master being utilized as the bidirectional signal between the cache 2 and the multiplexer 7.

The multiplexer 7, when data is outputted to the system bus SB, transmits either the control signal SCb or CSCb as the control signal SCc to the system buffer 6 in accordance with the multiplexer control signal SC1 from the cache 2, and, when data is inputted from the system bus SB, transmits the control signal SCc from the system buffer 6 as the control signal SCb to the CPU 1 or as the control signal CSCb to the cache 2 also in accordance with the multiplexer control signal SC1.

The address signal AD1 is transmitted from the CPU 1 to the cache 2, and from the CPU 1 to the system bus buffer 6. The address signal AD2 used only when the CPU 1 is the bus master is transmitted form the CPU 1 to the cache 2 and multiplexer 8, the address signal CAD2 used only when the cache 2 is the bus master being transmitted from the cache 2 to the multiplexer 8.

The multiplexer 8 has function to output either the address signal AD2 or CAD2 as the address signal AD3 to the system buffer 6 in accordance with the multiplexer control signal SC2 given from the cache 2.

In addition, the data signal SD is utilized as the bidirectional common signal among the CPU 1, the cache 2 and the system buffer 6. Reference letter $\phi$ designates clock given to the CPU 1 and cache 2.

In the cache system of the invention constructed as the above-mentioned, explanation will be given on a case where the CPU 1 does not use the cache 2 (case I) in comparison with that where the CPU 1 uses the cache 2 to cause a cache miss (case II).

When a memory system 3 generates the ready signal in the same way as the conventional, the transmission routes (both the cases I and II) to the system bus buffer 6 are quite same.

After the system buffer 6, in the case I, the control signal SCc including the ready signal is given as the control signal SCb to the CPU 1 of the bus master in accordance with the multiplexer control signal SC1 from the cache 2. On the other hand, in the case II, the control signal SCc including the ready signal is given as the control signal CSCb to the cache 2 of the bus master through the multiplexer 7, and at this time the CPU 1 is kept in a wait condition by the control signal SCa from the cache 2.

Thereafter, the cache 2 fetches a predetermined data as the data signal SD from the memory system 3 through the system bus buffer 6 and stores the data corresponding to the address instructed by the CPU 1 so that the control signal SCa is given to the CPU 1, thereby driving the CPU 1 in the wait state. Hence, the CPU 1 fetches the same data as that fetched by the cache 2 as the data signal SD.

When the case I is compared with the case II, the time required for the control signal SCc including the ready signal to reach the CPU 1 and cache 2 through the multiplexer, is assumed to be same. Accordingly, the entire processing required for the case II takes more time which is equal of the time when the cache 2 fetches data from the data signal SD to release the wait state of the CPU 1. However, since the main signals, such as data signal SD, all arrive at an input terminal of the CPU 1 (which are fetched at the same time of release of wait state of the CPU 1), the above-mentioned time is assumed to be as minute as negligible. As the result, the memory system 3 needs only generate the ready signal at the same timing even whichever is the bus master, the CPU 1 or the cache 2, whereby there is no need of changing the timing by a different bus master as the conventional. In this case, it is proper that the setup time standard for the ready signal of the cache 2 is the same as that of the CPU 1.

Also, the address output timing standard of the cache 2 based on clock φ is the most proper to be the same as that of the CPU 1. Hence, the address output timing standard viewed from the system bus 4 is equal with respect to the two bus masters of the CPU 1 and the cache 2, in other words, to the aforesaid cases I and II, because the address signal AD2 from CPU 1 and that CAD2 from the cache 2 pass through the same multiplexer 8.

Furthermore, in the present invention, the multiplexer 8 is utilized to enable the following access at high speed.

For the convenience of explanation, the address signal AD1 is assumed to be a 30 bits signal and the address signals AD2, CAD2 and AD3 to be two bit signals respectively. In the above construction, in a case where a cache miss occurs when the CPU 1 reads four words (32 bits) of continuous addresses (where two low order bits of the address $A_0$ initially to be accessed is logical "00"). The CPU 1 sends an instruction to access the four successive words from the control signal SCa to the cache 2, and intends to read the data of address $A_0$ from the cache 2, but the cache miss occurs. Thereafter, the cache 2 serves as the bus master to put the CPU 1 in the wait state by the control signal SCa and accesses the address $A_0$ of the memory system 3, and at this time the address signal AD3 of the output of the multiplexer 8 has been outputted prior to the occurrence of cache miss. Accordingly, since the bus master is CPU 1, the address signal as the address signal AD2 decided only by the CPU 1 has already been transmitted to the system buffer 6. The data to be accessed to address $A_0$ of the memory system 3 (not shown) and readout through the system bus buffer 6 and system bus SB or the like is written in by the data signal SD corresponding to the address $A_0$ because the ready signal in the control signal SCc from the system bus buffer 6 is transmitted as the control signal CSCb to the cache 2 by the multiplexer 7 in accordance with the multiplexer control signal SC1 from the cache 2.

Thereafter, the multiplexer control signal SC2 switches the output signal AD3 of the multiplexer 8 to the address signal CAD2 from the cache 2 and the address signal CAD2 from the cache 2 is changed into logical "01", "10" and "11" so that data of four continuous addresses ($A_0$, $A_0+1$, $A_0+2$ and $A_0+3$) from the memory system 3 are written in the cache 2. Then, the cache 2 sends the control signal SCa to the CPU 1 to thereby release the wait state thereof, and the bus master is returned to CPU 1, whereby the CPU 1 reads out from the cache 2 the data of four continuous addresses ($A_0$, $A_0+1$, $A_0+2$ and $A_0+3$).

Thus, the state of address signal AD1 is fixed by putting the CPU 1 in the wait state and the address signal CAD decided by the cache 2 is merely changed, so that CPU 1 can access the continuous addresses decided by the cache 2, whereby the CPU 1, even when in a cache miss, can readout data from the memory system at higher speed than the access time to the usual memory system.

In addition, in this embodiment, the memory system is shown as the peripheral unit connected with the system bus, but other peripheral units, if usable of the cache, may be applicable to the present invention. The same control is applicable to a needful signal other than the aforesaid address signal and ready signal.

Furthermore, even when the multiplexer 8 is removed and all the address signals are used as the common signal so as to be transmitted to the portion among the CPU 1, the cache 2 and the system bus buffer 6, the same effect is obtainable except that the high speed access of the continuous addresses to the memory system when in the aforesaid cache miss, is impossible.

As seen from the above, the present invention uses the signal line in common to the cache and CPU driven by the same timing clock and can select the signal instructed by either the cache or CPU of the bus master. Hence, the peripheral unit connected to the data bus, such as the memory system, can be designed at the same timing standard whichever is the bus master, cache or CPU.

Figure 4:
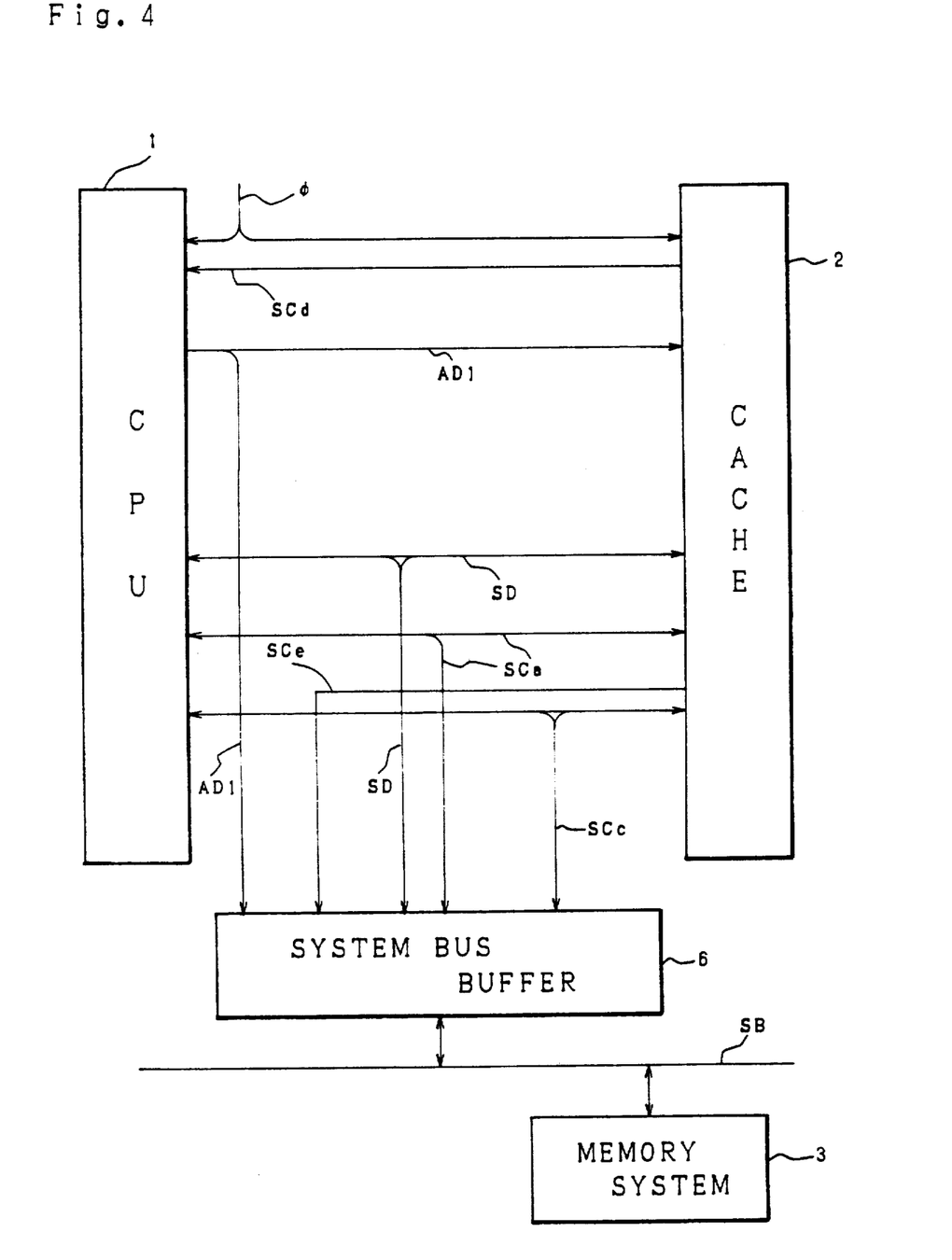
FIG. 4 is a block diagram of a first embodiment of the cache system of a second invention.

FIG. 4 is a block diagram of a CPU, a cache and peripheral units in an embodiment of a cache system of a second invention.

As shown in FIG. 4, a system bus buffer 6 is provided as a common interface between the CPU 1, the cache 2 and a system bus SB. The signal among these components are roughly classified into a control signal, an address signal and a data signal, the control signal SCa being utilized as a bidirectional common control signal among the CPU 1, the cache 2 and the system bus buffer 6. Reference letter SCd designates a reread request signal from the cache 2 to the CPU 1, and SCe designates an operation enabling signal from the cache 2 to the memory system 3. The address signal AD1 is transmitted from the CPU 1 to the cache 2 and system bus buffer 6. The data signal SD is utilized as bidirectional common signal among the CPU 1, the cache 2 and the system bus buffer 6. SCc designates a control signal inputted in common to the CPU 1 and cache 2 from the system bus buffer 6, which in this embodiment includes the ready signal from the memory system 3, and φ designates clock given to the CPU 1 and cache 2.

In the second invention constituted as above-mentioned, explanation will be given, in the same way as the first invention, on comparison of a case I where the CPU 1 uses no cache with that II where the CPU 1 uses the cache 2 to occur a cache miss.

At first, explanation will be given on readout operation from the memory system 3 when the CPU 1 does not use the cache 2. The CPU 1 inhibits readout operation from cache 2 by the control signal SCa and permits readout from the memory system 3. Address to be read in given by the address signal AD1 to the memory system 3, the ready signal from the memory system 3 is transmitted to the CPU 1 through the system bus SB, system bus buffer 6 and control signal SCc (case I), and at this time the cache 2 fetches no ready signal in the control signal SCc. The data from the memory system 3 is fetched into the CPU 1 through the system bus SB, system bus buffer 6 and SD signal after the ready signal is received therein.

Next, explanation will be given on an access method of memory system 3 when the CPU 1 uses the cache 2 to cause the cache miss (case II). The CPU 1 uses the control signal SCa to permit operation of cache 2 and inhibits that of memory system 3. Upon finding the data with respect to address AD1 is not in the cache 2, the cache 2 requests the CPU 1 to reread out (reaccess) data and by the control signal SCe enables the memory system 3 access acceptance. At the next cycle, the CPU 1 executes reread out corresponding to the reread request signal from the cache 2, and at this time the memory system 3 accepts the access to send the ready signal to the CPU 1 and cache 2 through the system bus SB, system bus buffer 6 and signal line SCc. The data is transmitted to the CPU 1 and cache 2 through the system bus SB, system bus buffer 6 and data signal SD, the CPU 1 and cache 2 fetch the data by the data signal SD after receiving the ready signal. The data is fetched in parallel to the CPU 1 and cache 2, in which the bus master is CPU 1. The signal (which SCa includes) indicating data fetching by CPU 1 is completed, causes the cache 2 to stop output of operation enable signal, that is, the control signal SCe, for the memory system 3.

The control signal SCc including the ready signal from the memory system 3 is transmitted to the CPU 1 and cache 2 in quite the same route in the cases I and II. As a result, the memory system 3 needs only generate the ready signal at the same timing for either the case I or II and there is no need of changing the timing as conventional. In this case, it is the most proper that the setup time standard for the ready signal of cache 2 is the same as that of CPU 1.

In addition, in this embodiment, the cache 2 operates dependently on the operation of the CPU 1 and never serves as the bus master. Therefore, in a case where the CPU 1 has a mode that CPU 1 continuously accesses a plurality of data (block transfer mode), the cache 2 must support the same operation mode as that of CPU 1. Also, in a case where the CPU 1 reads data only by one data and the cache 2, when in the case miss, accesses the memory system 3 only in the block transfer mode, this embodiment cannot correspond to the above matter. Regarding this matter, a system structure which can correspond to this matter will be described in a second embodiment of the second invention.

Figure 5:
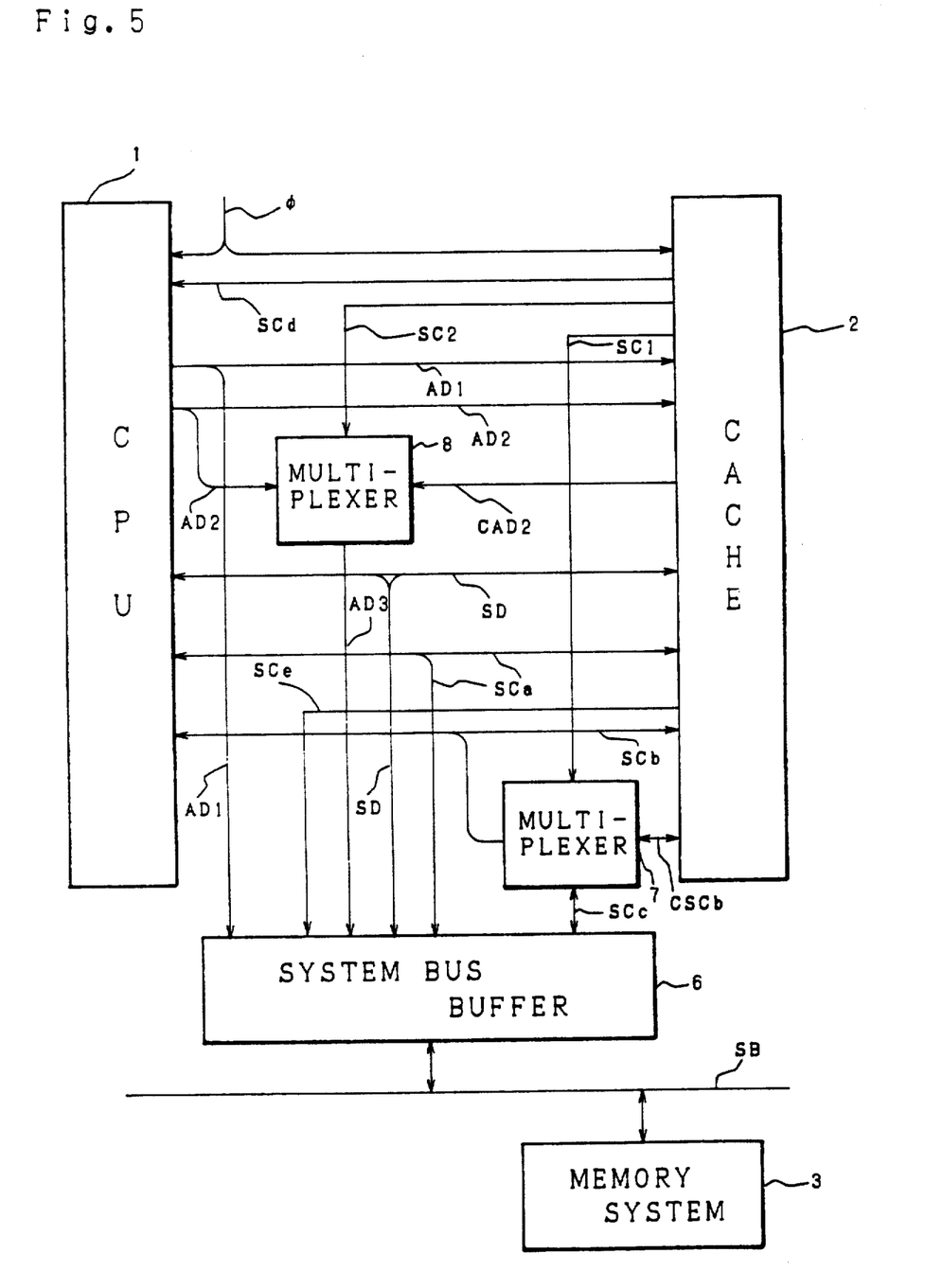
FIG. 5 is a block diagram of a second embodiment of the cache system of the second invention.

FIG. 5 is a block diagram showing peripheral units of a CPU and a cache of a cache system at a second embodiment of the second invention, in which the cache 2 accesses the memory system 3 only in the block transfer mode when a cache miss occurs.

In addition, the constitution shown in FIG. 5 is concretely a combination of the first invention shown in FIG. 3 with the first embodiment of the second invention shown in FIG. 4. Accordingly, description of the above is omitted.

In such constitution, explanation will be given on comparison of the case I where the CPU 1 does not use the cache 2 with that II where the same uses the cache 2 to cause the cache miss in the same way as the first invention and the first embodiment of the second invention. When the memory system 3 generates the ready signal in the same way as conventional, the transmission routes to the system bus buffer 6 both in the cases I and II are quite the same.

At first, explanation will be given on readout operation from the memory system 3 when the CPU 1 does not access the cache 2 (case I).

At this time, the CPU 1 is assumed to read single data.

The CPU 1 inhibits by the control signal SCa readout operation from cache 2 and permits read out from the memory system 3. Address to be read is outputted from AD1 and AD2, AD1 being directly outputted to the system bus buffer 6, AD2 being controlled by the control signal SC2 and outputted as AD3 to the system bus buffer 6 through the multiplexer 8.

The ready signal from the memory system 3 is sent to the multiplexer 7 through the system bus SB, system bus buffer 6 and control signal SCc. The multiplexer 7 is controlled by the control signal SC1, the ready signal included in the control signal SCc being outputted to the control signal SCb and sent to the CPU 1.

Data from the memory system 3 is transmitted to the CPU 1 through the system bus SB, system buffer 6 and data signal SD and fetched into the CPU 1 after the CPU 1 accepting the ready signal.

Next, explanation will be given on an access method to the memory system 3 in the case II where the CPU 1 accesses the cache 2 to cause the cache miss.

In this embodiment, the CPU 1, as above-mentioned, reads only the single data and the cache 2 is assumed to access the memory system 3 only in the block transfer mode when in case of a cache miss.

The CPU 1 enables by use of the control signal SCa operation of the cache 2 and inhibits operation of the memory system 3. Upon finding that the data with respect to the address AD, is not in the cache 2, the cache 2 requires the CPU 1 to reread out (reaccess) and enables access acceptance with respect to the memory system 3 by the control signal SCe. At the next cycle, the CPU 1 executes the reread out operation corresponding to the reread out request signal from the cache 2.

The read out operation by the CPU 1 is to read out the single data. Next, explanation will be given on two kinds of method of receiving a plurality of data by the cache 2 from the memory system 3.

A first method of the above is as follows:

(1) For the convenience of explanation, the address signal AD1 is assumed to be high-order 30 bits and that AD2 low-order 2 bits. Address of one data designated by the CPU 1 is represented by $A_0+2$ and the cache 2 is assumed to request the memory system 3 to transfer four data of $A_0$, $A_0+1$, $A_0+2$ and $A_0+3$. In addition, $A_0$ represents that the address signal AD2 of low-order two bits is a logical "00".

The address outputted form the CPU 1 with respect to the reread out request from cache 2 shows $A_0+2$, and at this time the address transmitted to the system bus buffer 6 is given high-order 30 bits by the address signal AD1 and the low-order two bits are introduced into the system buffer 6 as the address signal CAD2 from the cache 2 is sent to the address signal AD3, and at this time the address signal CAD2 represents a logical "00". Therefore, the memory system 3 reads the address $A_0$, the ready signal corresponding thereto is transmitted to the cache 2 through the system bus SB, the system bus buffer 6 and control signal SCc and then through the control signal CSCb from a multiplexer 7 controlled by the control signal SC1 from the cache 2.

Data is fetched to the cache 2 by the data signal SD. In order to transfer the three remaining data, the CPU 1 again issues the reread out request by the reread out request signal SCd. Therefore, the CPU 1 does not fetch the data corresponding to the address $A_0$ but again reads out the address data of address $A_0+2$. At this time, the cache 2 changes the address of address signal CAD2 into a logical "01" to fetch the data of $A_0+1$ in the same way as the above.

The cache 2 continues to fetch the data in the same way until the data required for block transfer is completed. Upon completing the data read out to the cache 2, the cache 2 again requests the reread out so that the CPU 1 corresponding to it reads out the data corresponding to address $A_0+2$, and at this time the address signal AD2 from the CPU 1 is inputted to the address signal AD2 from the CPU 1 is inputted to the address signal AD2 by controlling the multiplexer 8 corresponding to control signal SC2 so that the data of $A_0+2$ from the memory system 3 is fetched to the CPU 1 from the data signal SD, the ready signal being fetched to the CPU 1 through the system bus SB, system bus buffer 6 and control signal SCc.

(2) A second method is that when the CPU 1 uses the cache 2 to cause the cache miss (the case II), the CPU 1 permits operation of cache 2 by use of the control signal SCa and inhibits operation of the memory system 3. Upon finding the data with respect to the address AD1 is not in the cache 2, the cache 2 requests the CPU 1 to reread out and permits operation with respect to the memory system 3 by the control signal SCe.

At the next cycle, the CPU 1 operates to reread data corresponding to the reread out request signal from the cache 2. The address outputted from the CPU 1 with respect to the reread out request of the cache 2 represents $A_0+2$, and at this time the address sent to the system bus buffer 6 is given the high-order 30 bits by the address signal AD1, and the multiplexer 8 controlled by the control signal SC2 from the cache 2 transmits the address signal CAD2 from the cache 2 to the address signal AD3 so that the low-order two bits are introduced into the system bus buffer 6, and at this time the address signal CAD2 shows a logical "00". Therefore, the memory system 3 reads out the address $A_0$, the ready signal corresponding thereto is transmitted from the memory system 3 to the cache 2 through the system bus SB, system bus buffer 6 and control signal SCc and then through the control signal CSCb from the multiplexer controlled by the control signal SC1 from the cache 2.

The data is fetched into the cache 2 through the data signal SD. In addition, at this time, the ready signal is transferred only to the cache 2 and the ready signal from the cache 2 is not sent to the CPU 1. Therefore, the CPU 1 is put in the wait state so that the cache 2 becomes the bus master.

The cache 2 keeps intact the address signal AD1 of high-order 30 bits from the CPU 1 in order to transfer the three remaining data and changes to a logical "01" a value of address signal AD3 given from the address signal CAD2 through the multiplexer 8, the control signal for the memory system 3 is transmitted thereto through the control signal CSCb, multiplexer 7 and control signal SCc, thereby fetching the data of address $A_0+1$ into the cache 2.

In the same way, the address signal CAD2 is changed to fetch the data of $A_0+2$ and $A_0+3$, thereafter the multiplexer 8 is switched to transfer the address signal AD2 and the address $A_0+2$ designated by the CPU 1 is transmitted to the system bus buffer 6. The data corresponding to the address $A_0+2$ from the memory system 3 is fetched through the data signal SD to the CPU 1, the ready signal from the same being fetched into the CPU 1 through the system bus SB, system bus buffer 6 and control signal SCc.

In the cases I and II (items (1) and (2)), the control signal SCc including the ready signal from the memory system 3 is transmitted from the control signal CSCb to the cache 2 through the multiplexer 7 accompanying with the multiplexer control signal SC1 from the cache 2, or from the control signal SCb to the CPU 1, both cases being different from each other in the transmission route but equal in the delay time to each other. As the result, the memory system 3 needs only generate the ready signal at the same timing for either the case I or II, whereby there is no need of changing the timing due to the different bus master as conventional. In this case, it is the most proper that the setup time standard for the ready signal of the cache 2 is the same as that of CPU 1.

Figure 6:
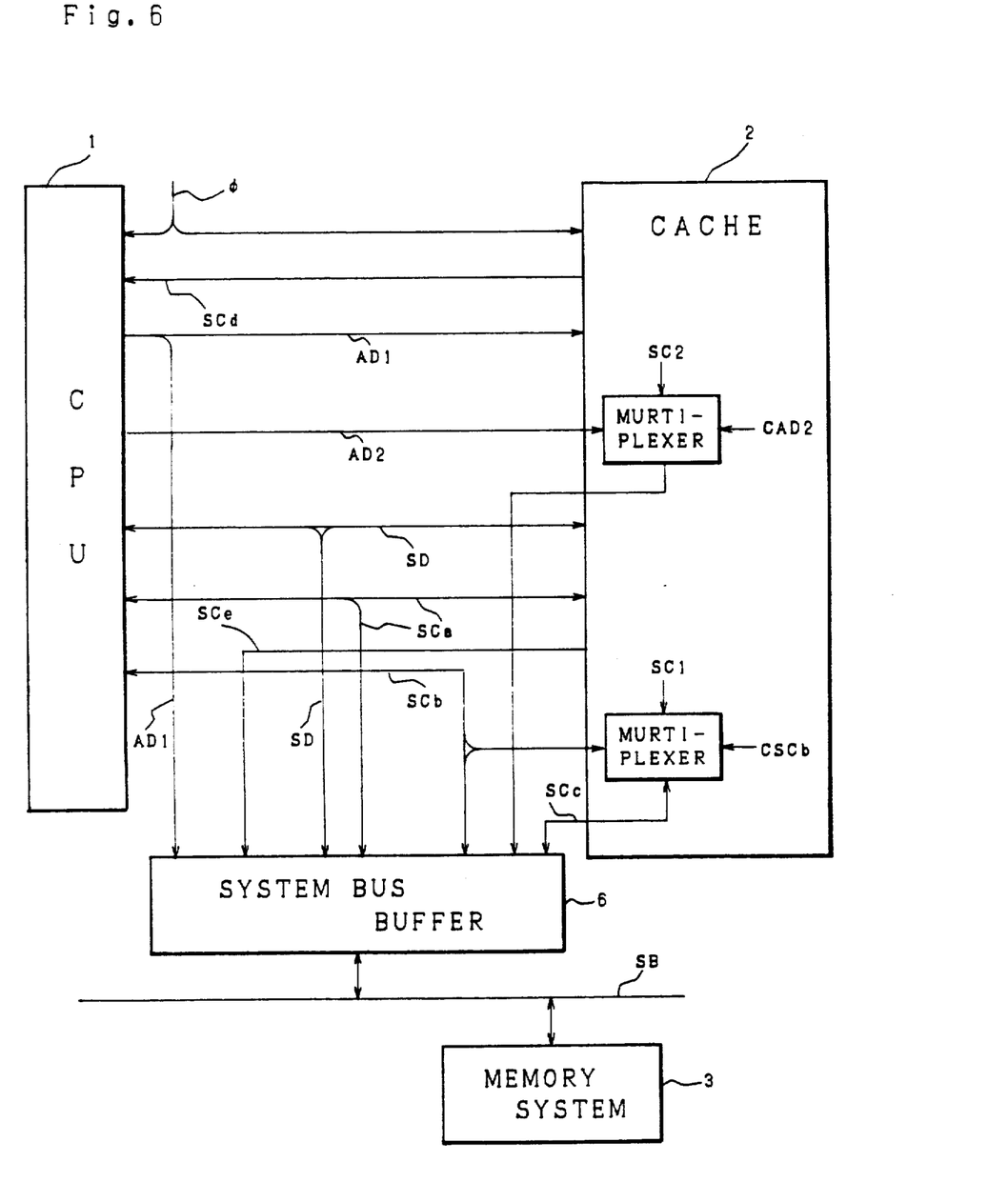
FIG. 6 is a block diagram of a third embodiment of the cache system of the second invention.

Next, explanation will be given on a third embodiment of the cache system of the invention with reference to FIG. 6, which houses in an integrated circuit for the cache the multiplexers 7 and 8 controlling the signals from the CPU 1 and cache 2 of the second embodiment shown in FIG. 5, thereby reducing wirings for the CPU 1 and the cache 2, and which operates in the same way as the second embodiment shown in FIG. 5.

In addition, the embodiments of the second invention each show the memory systems as the peripheral unit connected to the system bus, but other peripheral units, if they being able to use the cache, may be applied with the present invention. To other necessary signals other than the address signal and ready signal, the same control as the above-mentioned may be applicable.

As seen from the above, the first embodiment of the cache system of the second invention includes the reexecution request signal for requesting CPU to readout or write-in (access) of data and the access enabling signal with respect to the memory other than the cache so that the cache can always operate dependently on the CPU, the peripheral unit, even when the cache is used, transmitting and receiving the signal always with the same object.

Also, in the second and third embodiments of cache system, the cache and CPU driven by clock of the same timing use the common signal line, and the utilized signals are the same except for the signal decided only by the cache and that decided only by the CPU. Also, the cache has the signal for requesting the CPU to reread out and rewrite-in and the access enabling signal to the memory other than the cache, whereby the peripheral unit, no matter which may be the bus master, CPU or cache, can be assumed to carry out transmitting and receiving of signal with about the same object. Hence, the peripheral unit, such as the memory system, connected to the data bus, whichever is the bus master, the cache or the CPU, can be designed at the same timing.

Figure 7:
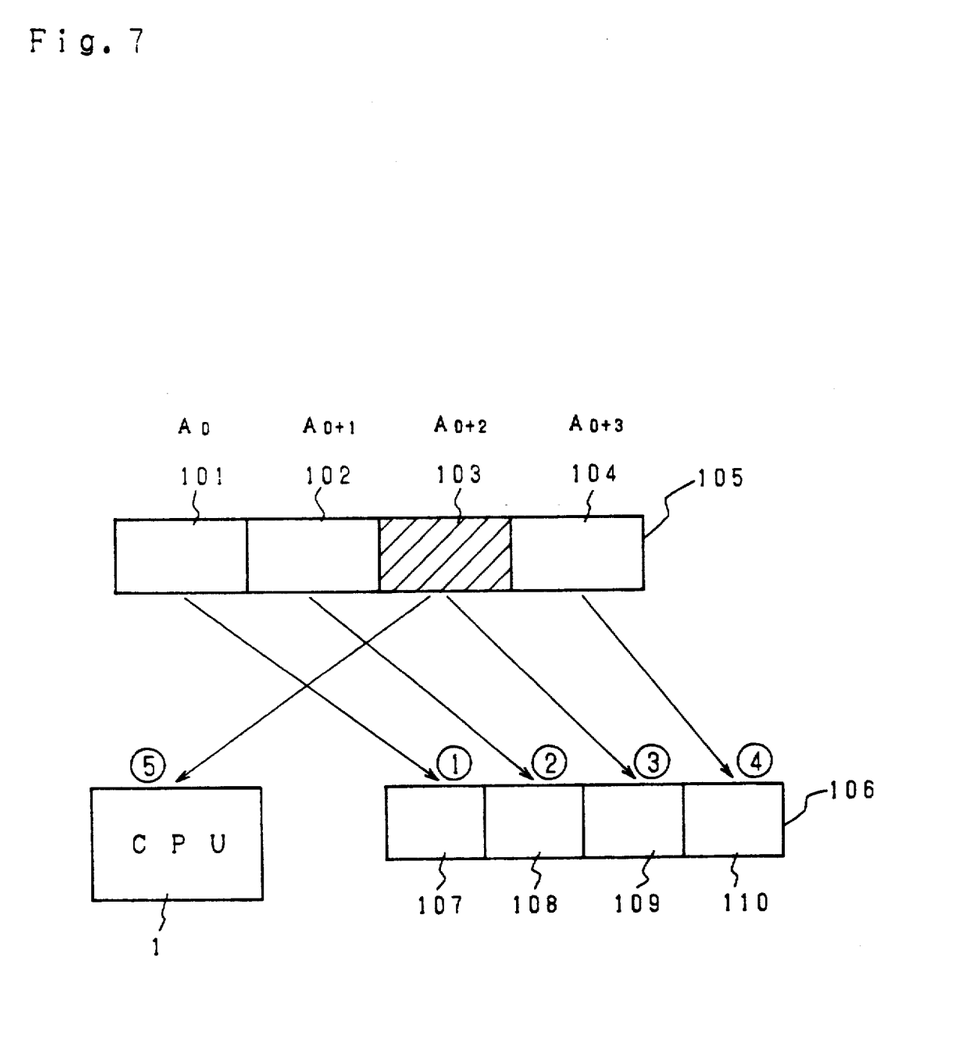
FIG. 7 is a typical view explanatory of the condition of data transfer carried out by the cache system shown in FIG. 5.

In the second embodiment of the cache system of the second invention shown in FIG. 5, the data transfer from the memory system 3 to the cache 2 is detailed as follows:

In FIG. 7, reference numerals 101, 102, 103 and 104 in the memory system 3 designate data corresponding to addresses $A_0$, $A_0+1$, $A_0+2$ and $A_0+3$ respectively, 105 designates a data block including data of addresses $A_0$, $A_0+1$, $A_0+2$ and $A_0+3$, 107, 108, 109 and 110 designate data memories in the cache respectively, and 106 designates one data block including the data memories 107, 108, 109 and 110.

In this embodiment, the CPU 1 designates address $A_0+2$, but the cache 2 having made a cache miss accesses addresses $A_0$, $A_0+1$, $A_0+2$ and $A_0+3$ in this order from the memory system 3, the data 101, 102, 103 and 104 are stored into the cache memories 107, 108, 109 and 110 in the order ① to ④, and thereafter the data 103 corresponding to the address $A_0+2$ to which the CPU 1 accesses is stored in the CPU 1 (the order ⑤). Therefore, five times data accesses have been executed.

Next, a data transfer method from the memory system to the cache when a cache miss occurs with respect to the read operation from CPU as disclosed in the Japanese Patent Application Laid-Open No. 54-128636 (1979) will be described with reference to FIG. 8.

Figure 8:
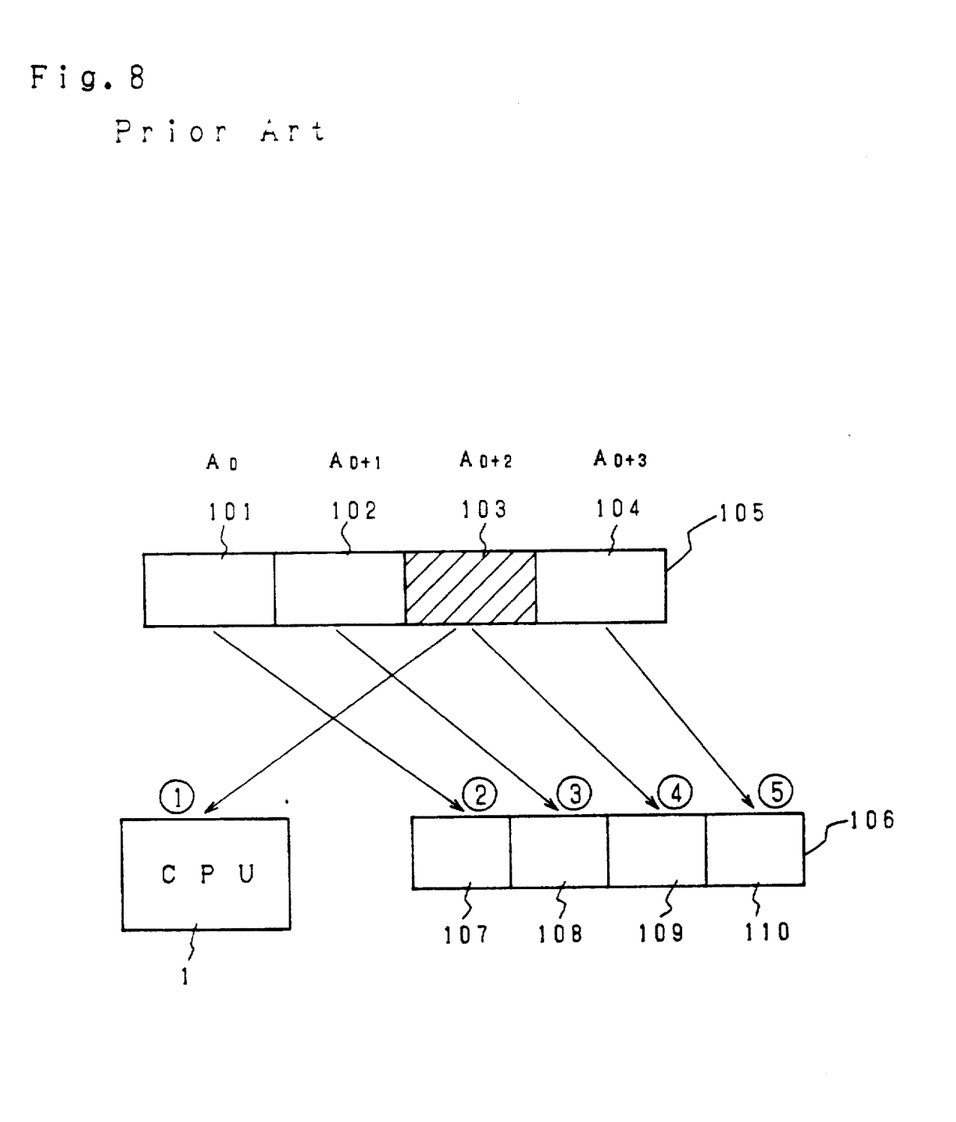
FIG. 8 is a typical view explanatory of the condition of data transfer carried out by a conventional cache system.

In FIG. 8, reference numerals 101, 102, 103 and 104 in the memory system 3 designate data corresponding to addresses $A_0$, $A_0+1$, $A_0+2$ and $A_0+3$ respectively, 105 designates a data block including data of addresses of $A_0$, $A_0+1$, $A_0+2$ and $A_0+3$, 107, 108, 109 and 110 designate data memories in the cache respectively, and 106 designates a data block including the data memories 107, 108, 109 and 110. In this example, when CPU 1 is assumed to designate the address $A_0+2$, the cache 2 having made the cache miss at first transfers the address $A_0+2$ from the memory system 3 to the CPU (the order ①). Thereafter, it accesses three addresses $A_0$, $A_0+1$, $A_0+2$ and $A_0+3$ in this order and the data 101, 102, 103 and 104 are stored in the cache memories 107, 108, 109 and 110 in the order of ② to ⑤ respectively, thereby data access having been carried out five times.

In a case where the cache accesses the memory system 3 only in the block transfer mode through which the cache transmits a plurality of data from the memory system when the cache makes a cache miss with respect to the read access of single data from CPU, it is impossible to carry out data transfer from the memory system to the cache at the minimum number of times.

Therefore, a control method for the cache system of a third invention, which can carry out the data transfer from the memory system to the cache at the minimum number of times when a plurality of data is block-transferred during the cache miss, will be described.

In this embodiment, a control method by the second embodiment of the second invention in the case where the cache access the memory system only in the block transfer mode for transferring a plurality of data from the memory system 3 when the cache 2 makes a cache miss with respect to the read access of single data from CPU 1 will be shown.

In such construction, the case where the CPU 1 uses no cache (case I) and that where the CPU 1 uses the cache 2 to cause a cache miss are compared with each other and described in the same way as the aforesaid embodiments.

At first, explanation will be given on readout operation from the memory system 3 when the CPU 1 does not access the cache 2 (case I).

At this time, the CPU 1 is assumed to read single data.

The CPU 1 inhibits by the control signal SCa readout operation from cache 2 and permits read out from the memory system 3. Address to be read is outputted from AD1 and AD2, AD1 being directly outputted to the system bus buffer 6, AD2 being controlled by the control signal SC2 and outputted as AD3 to the system bus buffer 6 through the multiplexer 8.

The ready signal from the memory system 3 is sent to the multiplexer 7 through the system bus SB, system bus buffer 6 and control signal SCc. The multiplexer 7 is controlled by the control signal SC1, the ready signal included in the control signal SCc being outputted to the control signal SCb and sent to the CPU 1.

Data from the memory system 3 is transmitted to the CPU 1 through the system bus SB, system buffer 6 and data signal SD and fetched into the CPU 1 after the CPU 1 accepting the ready signal.

Next, explanation will be given on an access method to the memory system 3 in the case II where the CPU 1 accesses the cache 2 to cause the cache miss.

In this embodiment, the CPU 1, as above-mentioned, reads only the single data and the cache 2 is assumed to access the memory system 3 only in the block transfer mode when in case of a cache miss.

The CPU 1 enables by use of the control signal SCa operation of the cache 2 and inhibits operation of the memory system 3. Upon finding that the data with respect to the address AD, is not in the cache 2, the cache 2 requires the CPU 1 to reread out (reaccess) and enables access acceptance with respect to the memory system 3 by the control signal SCe. At the next cycle, the CPU 1 executes the reread out operation corresponding to the reread out request signal from the cache 2.

The read out operation by the CPU 1 is to read out the single data. Next, explanation will be given on two kinds of method of receiving a plurality of data by the cache 2 from the memory system 3.

A first method of the above is as follows: (1) For the convenience of explanation, the address signal AD1 is assumed to be high-order 30 bits and that AD2 low-order 2 bits. Address of one data designated by the CPU 1 is represented by $A_0+2$ and the cache 2 is assumed to request the memory system 3 to transfer four data of $A_0$, $A_0+1$, $A_0+2$ and $A_0+3$. In addition, $A_0$ represents that the address signal AD2 of low-order two bits is a logical "00".

Address outputted from the CPU 1 with respect to the reread out request represents $A_0+2$, and at this time the address to be sent to the system buffer 6 is given highorder 30 bits by the address signal AD1 and low-order two bits are introduced into the system bus buffer 6 as the multiplexer 8 controlled by the control signal SC2 from the cache 2 transmits to the address signal AD3 the address signal CAD2 from the cache 2. At this time, the address signal CAD2 shows a logical "11".

This address indicates address $A_0+3$ incrementing the address $A_0+2$ designated by the CPU 1. The ready signal from the memory system 3 corresponding to the address $A_0+3$ is sent to the cache 2 through the system bus SB, system bus buffer 6, control signal SCc, and control signal CSCb by the multiplexer 7 controlled by the control signal SC1 from the cache 2.

Data is fetched to the cache 2 by the data signal SD. In order to transfer the three remaining data, the CPU 1 again issues the reread out request by the reread out request signal SCd. Therefore, the CPU 1 does not fetch the data corresponding to the address $A_0$ but again reads out the address data of address $A_0+2$.

At this time, the cache 2 increments address of address signal CAD2 and accesses the next address. In addition, when incremented, the address transfers the highest-order address of the address in the block to the lowest-order address. The access in such order is called herein the round robin method access. Therefore, the address signal CAD2 of the cache 2 is a logical "00" to fetch data of address $A_0$.

The cache 2 continues data fetch until the data required to fetch the block transfer is completed. At the last read out of data to the cache 2, data is transferred to the address $A_0+2$ designated by the CPU 1.

The cache 2 requests again reread out for the last data transfer, and the CPU 1, corresponding thereto, reads out data corresponding to the address $A_0+2$. The ready signal from the memory system 3 corresponding to the address $A_0+2$ is transmitted to the cache 2 through the system bus SB, system bus buffer 6, and control signal SCc and then through the control signal CSCb by the multiplexer 7 controlled by the control signal SC1 from the cache 2. The data is fetched to the cache 2 by the data signal SD. Thereafter, the cache 2 sends the ready signal SCb to the CPU 1, whereby the CPU 1 fetches data corresponding to address $A_0+2$, and at this time the cache 2 of course requests no reread out to the CPU 1.

In addition, even when the system is so constituted that the ready signal in access of address $A_0+2$ designated by the CPU 1 are received in parallel by the CPU 1 and cache 2, the data corresponding to address $A_0+2$ can be fetched in parallel into the CPU 1 and cache 2.

(2) A second method is that when the CPU 1 uses the cache 2 to cause the cache miss (the case II), the CPU 1 permits operation of cache 2 by use of the control signal SCa and inhibits operation of the memory system 3. Upon finding the data with respect to the address AD1 is not in the cache 2, the cache 2 requests the CPU 1 to reread out and permits operation with respect to the memory system 3 by the control signal SCe.

At the next cycle, the CPU 1 operates to reread data corresponding to the reread out request signal from the cache 2. The address outputted from the CPU 1 with respect to the reread out request of the cache 2 represents $A_0+2$, and at this time the address sent to the system bus buffer 6 is given the high-order 30 bits by the address signal AD1, and the multiplexer 8 controlled by the control signal SC2 from the cache 2 transmits the address signal CAD2 from the cache 2 to the address signal AD3 so that the low-order two bits are introduced into the system bus buffer 6, and at this time the address signal CAD2 shows a logical "11". The ready signal from the memory system 3 corresponding to the address $A_0+3$ is sent to the cache 2 through the system bus SB, system bus buffer 6 and control signal SCc, and then through the control signal CSCb by the multiplexer 7 controlled by the control signal SC1 from the cache 2.

The data is fetched into the cache 2 through the data signal SD. In addition, at this time, the ready signal is transferred only to the cache 2 and the ready signal from the cache 2 is not sent to the CPU 1. Therefore, the CPU 1 is put in the wait state so that the cache 2 becomes the bus master.

The cache 2 keeps intact the address signal AD1 of high-order 30 bits from the CPU 1 in order to transfer the three remaining data and changes to a logical "00" a value of address signal AD3 given from the address signal CAD2 through the multiplexer 8, the control signal for the memory system 3 is transmitted thereto through the control signal CSCb, multiplexer 7 and control signal SCc, thereby fetching the data of address $A_0+1$ into the cache 2.

Also, herein, as described in the first method in item (1), accessing is executed by the round robin method in the block address, so that data of address $A_0$ is accessed next to address $A_0+3$.

In the same way, the address signal CAD2 is changed so that data of $A_0+1$ and $A_0+2$ are fetched to the cache 2. The address $A_0+2$ is designated by the CPU 1 so that the cache 2 transmits the ready signal SCb to the CPU 1, whereby the CPU 1 fetches the data corresponding to address $A_0+2$, and at this time the cache 2 of course requests the CPU 1 no reread out.

In addition, even in the case where the ready signal, when the address $A_0+2$ designated by CPU 1 is accessed, is adapted to be received in parallel by the CPU 1 and cache 2, the data corresponding to the address $A_0+2$ can be fetched to the CPU 1 and cache 2 in parallel.

Thus, in this embodiment, the data of address designated by the CPU 1 can lastly be transferred from the memory system 3 to the CPU 1 and cache 2 in parallel.

Thus, on the structure shown in FIG. 5 it has been described that when the CPU 1 makes a cache miss with respect to the single data and the cache 2 transfers a plurality of blocks from the memory system 3, data of address designated by the CPU 1 and once circularly incremented in the block address is at first transferred, the remaining data are transferred in the same order, and at last the data corresponding to address designated by the CPU 1 is transferred into the CPU 1 and cache 2 in parallel, thereby enabling the data to be transferred at the minimum number of times. Next, the data transfer method from the memory system 3 to the cache 2 when the cache miss is made with respect to the read operation from the CPU 1 will be described with reference to FIG. 9.

Figure 9:
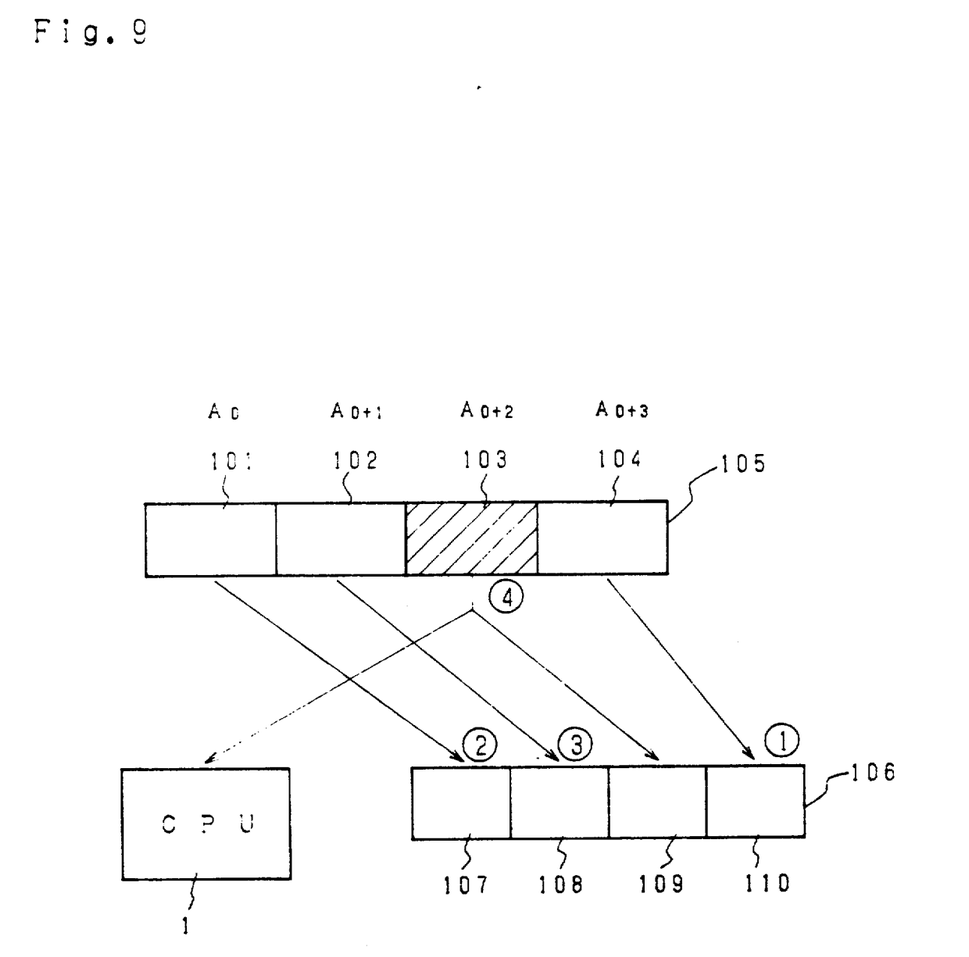
FIG. 9 is a typical view explanatory of the condition of data transfer carried out by a first embodiment of a control method for the cache system.

In FIG. 9, reference numerals 101, 102, 103 and 104 designate data in a memory system 3 corresponding to addresses $A_0$, $A_0+1$, $A_0+2$ and $A_0+3$ respectively, 105 designates a data block including data of addresses $A_0$, $A_0+1$, $A_0+2$ and $A_0+3$, 107, 108, 109 and 110 designate data memories in the cache respectively, and 106 designates one data block including the data memories 107, 108, 109 and 110.

In this embodiment, the CPU 1 designated address $A_0+2$, and at this time the cache 2 having made a cache miss increments the address designated by the CPU 1 and initially transfers the data of the address. Thereafter, the next address to the data accessed by the CPU 1 is read in the cache 2, and then the address in the block is incremented so that, next to the highest-order address in the block, the lowest-order address is accessed. Such access method is called the round robin method as described above. Thus, the addresses $A_0+3$, $A_0$ and $A_0+1$ are accessed in this order from the memory system 3, the data 104, 101 and 102 are stored in the order of ①to ③ in the cache memories 110, 107 and 108, and thereafter the data 103 corresponding to address $A_0+2$ accessed by the CPU 1 is stored in the CPU 1 and cache 2 in parallel (in the order ④). Thus, in a case where the cache accesses the memory system 3 only in the block transfer mode which transfers by the cache a plurality of data from the memory system when the cache makes a cache miss with respect to READ access of single data from the CPU, it is possible to transfer data from the memory system to the cache in the minimum number of times.

Next, explanation will be given on a modified embodiment of the cache system control method of the invention with respect to FIG. 10.

Figure 10:
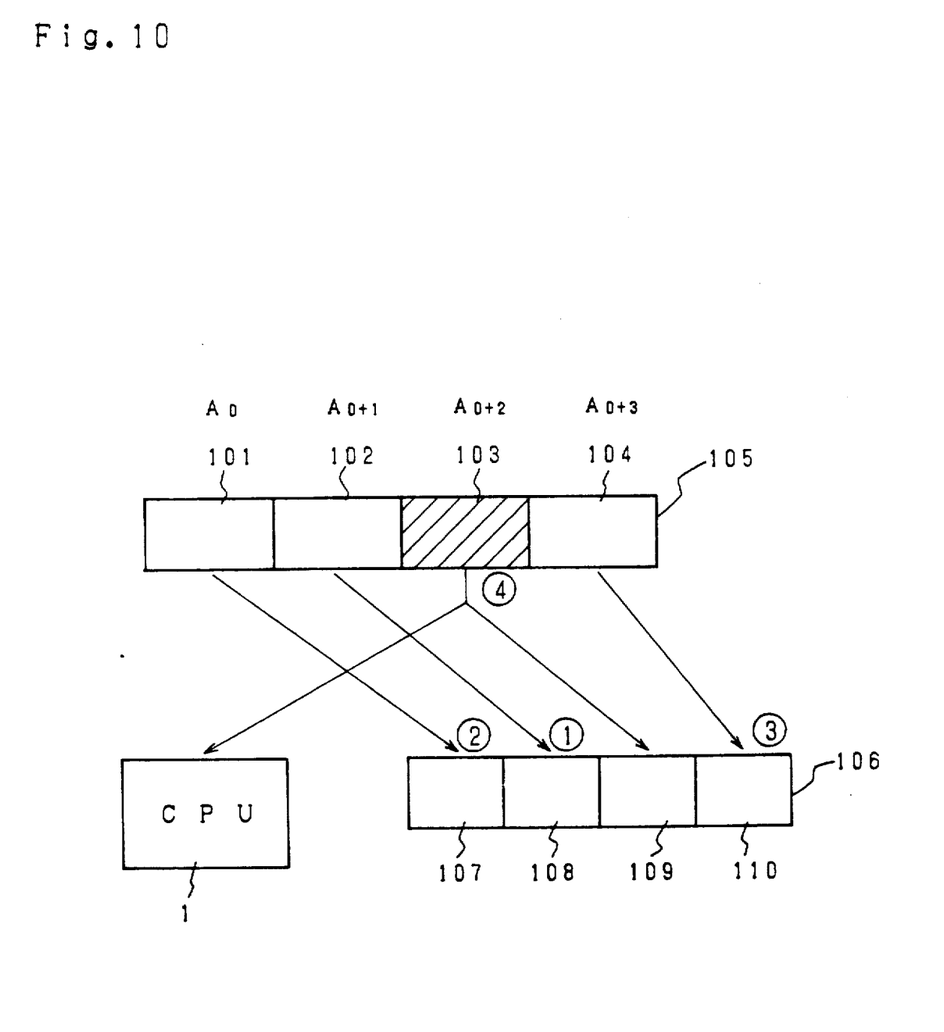
FIG. 10 is a typical view explanatory of the condition of data transfer carried out by the first embodiment of a control method for the cache system of the invention.

In FIG. 10, reference numerals 101, 102, 103 and 104 designate data in a memory system 3 corresponding to addresses $A_0$, $A_0+1$, $A_0+2$, and $A_0+3$ respectively, 105 designates a data block including the address $A_0$, $A_0+1$, $A_0+2$, and $A_0+3$, 107, 108, 109 and 110 designate data memories in the cache respectively, and 106 designates one data block including data memories 107, 108, 109 and 110.

In this embodiment, the CPU 1 designates address $A_0+2$, and at this time the cache 2 having made a cache miss transfers at first the address designated by the CPU 1 and decremented by the round robin method, and similarly the remaining data also is continuously transferred in the order of decrement in the round robin method. In other words, the memory system 3 accesses the addresses $A_0+1$, $A_0$ and $A_0+3$ in this order, the data 102, 101 and 104 are stored in the cache memories 108, 107 and 110 in the order of ① to ③, and thereafter the data 103 of the $A_0+2$ address accessed by the CPU 1 is stored in the CPU 1 in parallel to the data memory 109. Thus, in a case where, when the cache makes a cache miss with respect to the read access of single data from the CPU, the cache accesses the memory system only in the block transfer method which transfers by the cache a plurality of data from the memory system, it is possible to transfer the data from the memory system to the cache at the minimum number of times.

As seen from the above, the control method for the cache system of the invention at first transfers the data of the address next to the address designated by the CPU from the memory system to the CPU in a case where the cache accesses the memory system 3 only in the block transfer mode which transfers a plurality of data from the memory system when the single data is read out from the CPU and the cache makes a cache miss with respect to access, thereafter transfers data by changing the address in a manner by round robin method, and at least the data designated by the CPU and cache-missed by the cache is transferred in parallel to the cache and CPU, thereby enabling the data transfer from the memory system to the cache to be carried out at the minimum number of times.

An this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A cache system in which a CPU and a cache, each driven by a common timing clock and operative as a bus master, are connected through a system bus to a memory system, comprising:
   a first signal line comprising a first portion connected between said CPU and said cache, and a second portion connected to said system bus, for transmitting and receiving a common signal to and from whichever one of said CPU and said cache is operating as a bus master;
   a second signal line comprising a common portion connected to said system bus, a first portion connected to said CPU and a second portion connected to said cache, said first and second portions intermittently connected to said common portion;
   first means for placing said CPU in a standby state and connecting the common portion to the first portion of said second signal line between said system bus and said cache when said cache is operating as a bus master; and
   second means for connecting the common portion to the second portion of said second signal line between said system bus and said CPU when said CPU is operating as a bus master.

2. The system of claim 1, including means for detecting that object data for accessing is not stored in said cache during a memory access cycle controlled by said CPU and, in response, placing said CPU in a standby state, transferring object data from said memory system to said cache, and storing said object data transferred to said cache in said CPU.

3. The system of claim 1, wherein said first and second means include a multiplexer controlled by a signal generated by said cache.

4. A cache, comprising:
   a CPU, a cache and a memory system connected directly or indirectly to a common system bus, said CPU controlling memory access operations for accessing object data;
   means for detecting that object data to be accessed during a memory access operation controlled by said CPU is not stored in said cache; and
   means incorporated in said cache and responsive to a detection by said means for detecting for generating a first control signal requesting said CPU to re-execute a memory access operation of said memory system for said object data and a second control signal for requesting said memory system to accept said memory access operations requested by said CPU.

5. A cache system, comprising: a CPU, a cache and a memory system each driven by a common timing clock and connected directly or indirectly to a system bus, each said CPU and cache being operable as a bus master, said CPU controlling memory access operations for accessing object data;
   a first signal line connected to said system bus, said CPU and said cache and transmitting and receiving signal to and from whichever one of said CPU and cache is operating as a bus master;
   a second signal line;
   means for selectively connecting said second signal line between said system bus and said CPU or between said system bus and said cache, wherein said second signal line carries a different signal depending on which one of said CPU and said cache is operating a bus master;
   means for detecting that object data to be accessed during a memory access operation controlled by said CPU is not stored in said cache; and
   means incorporated in said cache and responsive to a detection by said means for detecting for generating a first control signal requesting said CPU to re-execute a memory access operation of said memory system for said object data and a second control signal for requesting said memory system to accept said memory access operation requested by said CPU.

6. A cache system of claim 5, wherein said means for selectively connecting comprises a multiplexer controlled by a signal generated by said cache.

7. A method of controlling a cache system having a CPU, a cache and a memory system, comprising the steps of:
   controlling said CPU to access object data possibly stored in said cache;
   if said object data is not stored in said cache and a plurality of data is available to be block-transferred from said system memory to said cache,
   (a) first sequentially transferring, from said memory system and writing to said cache, remaining available data except for said object data while changing the block-address by one, and (b) then transferring said object data, from said memory system whereby said CPU and said cache accept said object data in parallel.

8. The method of claim 7, wherein said block-address is incremented during said steps of (a) and (b).

9. The method of claim 7, wherein said block-address is decremented during said steps of first and sequentially transferring.

* * * * *